United States Patent [19]

Ishikawa

[11] Patent Number: 4,850,485

[45] Date of Patent: Jul. 25, 1989

[54] CARTRIDGE MAGAZINE

[75] Inventor: Masatoshi Ishikawa, Odawara, Japan

[73] Assignee: Hitachi, Ltd., Tokyo, Japan

[21] Appl. No.: 182,842

[22] Filed: Apr. 18, 1988

[30] Foreign Application Priority Data

Apr. 27, 1987 [JP] Japan ................... 62-101918

[51] Int. Cl.$^4$ ........................................... B65D 85/672
[52] U.S. Cl. ................................... 206/387; 211/40
[58] Field of Search .................... 206/387; 211/40; 312/15, 350

[56] References Cited

U.S. PATENT DOCUMENTS

| | | | |
|---|---|---|---|
| 3,885,670 | 5/1975 | Cousino | 206/387 |
| 4,253,567 | 3/1981 | Goldammer | 206/387 |
| 4,273,277 | 6/1981 | Stone | 206/387 |
| 4,287,989 | 9/1981 | Plummer | 206/387 |
| 4,293,075 | 10/1981 | Veralrud | 206/387 |
| 4,361,233 | 11/1982 | Holkestad | 206/387 |
| 4,365,713 | 12/1982 | Eluan | 206/387 |
| 4,407,411 | 10/1983 | Lowry | 206/387 |
| 4,678,245 | 7/1987 | Fouassier | 206/387 |

Primary Examiner—Joseph Man-Fu Moy
Attorney, Agent, or Firm—Fay, Sharpe, Beall, Fagan, Minnich & McKee

[57] ABSTRACT

A cartridge magazine capable of holding and releasing a plurality of cartridge magnetic tapes therein and therefrom by using an automatic cartridge changer, characterized in that each cartridge magnetic tape storage member has a first opening from and into which a cartridge magnetic tape can be removed and loaded in a certain direction, at least a second opening from and into which the cartridge magnetic tape can be removed and loaded in a direction opposite to the mentioned direction, and a means for preventing the cartridge magnetic tape from running out from the opening when the magnetic tape is loaded into the storage member, the run-out preventing means being released from a run-out preventing force at a desired time.

16 Claims, 2 Drawing Sheets

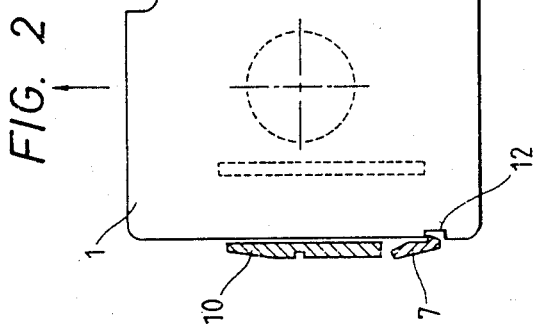
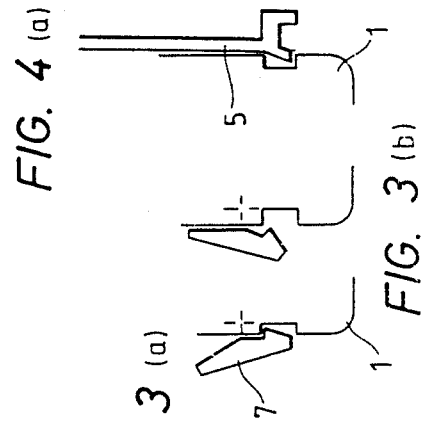
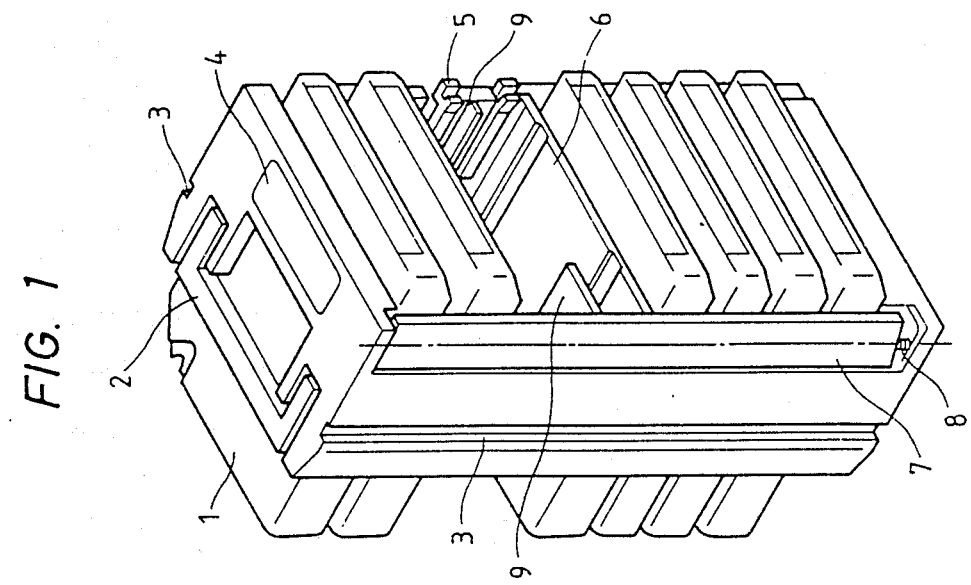

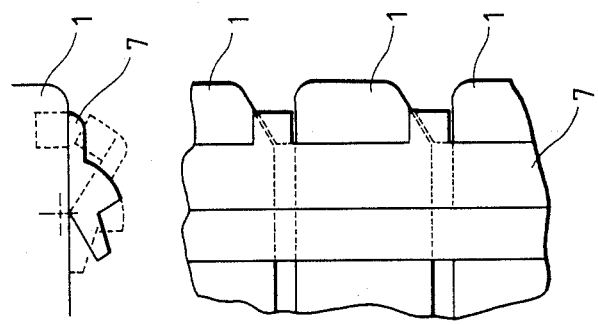
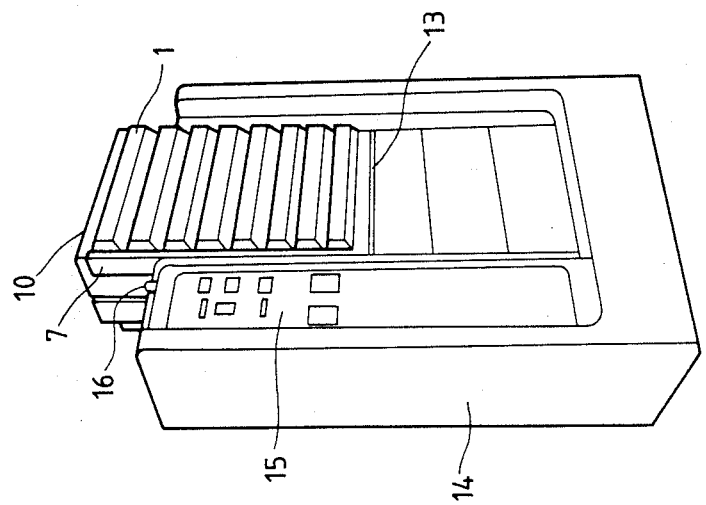

CARTRIDGE MAGAZINE

BACKGROUND OF THE INVENTION

1. Field of the Invention

This invention relates to a cartridge magazine for an automatic cartridge changer for cartridge magnetic tapes, and more particularly to a cartridge magazine suitable for removing and loading an arbitrarily selected cartridge magnetic tape therefrom and thereinto even when the automatic cartridge changer is in operation.

2. Description of the Prior Art

Conventional cartridge magazines include a cartridge magazine for holding cartridges therein, which magazine is provided at a cartridge inlet-outlet port with a latch stopper for cartridges as disclosed in Japanese Patent Laid-open No. 80676/1986. However, in this prior art cartridge magazine, consideration is not given to operations for removing and loading a cartridge magnetic tape therefrom and thereinto as necessary while an automatic cartridge changer is in operation.

In the above-mentioned conventional techniques, in which no consideration is given to operations for removing and loading a cartridge magnetic tape from and into a cartridge magazine in operation, an unprocessed or processed cartridge magnetic tape is removed. In order to add a cartridge magnetic tape to the magazine, it is necessary to run the automatic tape changing operation to the end, remove the cartridge magazine from the automatic cartridge changer, and then carry out the adding operation. This increases the number of magazine handling steps that need to be executed by the operator.

SUMMARY OF THE INVENTION

An object of the present invention is to provide a compact cartridge magazine capable of solving the problems encountered in the above-described conventional techniques by permitting the removal and loading of a cartridge magnetic tape freely from and into the cartridge magazine even when an automatic cartridge changer is in operation.

To achieve this object, the present invention provides a cartridge magazine containing a plurality of cartridge magnetic tapes mounted on an automatic cartridge chamber. The tapes are used to write and read information. Each cartridge magnetic tape storage member has a first opening from and into which a cartridge magnetic tape can be removed and loaded in a first direction, at least a second opening from and into which a cartridge magnetic tape can be removed and loaded in a second direction. Each cartridge magnetic tape is prevented from running out from each opening when the tape is loaded into the storage member. Further, when run-out is desired the structure preventing the run-out can be released.

BRIEF DESCRIPTION OF THE DRAWINGS

FIG. 1 is a perspective view of a cartridge magazine;

FIG. 2 is a sectional view of the cartridge magazine and a cartridge magnetic tape;

FIGS. 3a, 3b and 4a, 4b are schematic diagrams illustrating the prevention of run-out of a magnetic tape cartridge;

FIG. 5 is a perspective view illustrating the cartridge magazine mounted on an automatic cartridge changer; and FIG. 6 is a partial view of the cartridge magnetic tape run-out preventing means.

DETAILED DESCRIPTION OF THE PREFERRED EMBODIMENTS

An embodiment of the present invention will now be described with reference to the drawings. FIG. 1 is a perspective view showing the construction of an embodiment of the present invention. Referring to the drawing, each cartridge magnetic tape 1 consists, for example, of a ½ inch cartridge magnetic tape used for computers, an example of which is a cartridge magnetic tape with a feed reel contained in the cartridge.

A cartridge magazine is made in the shape of a frame having four flat surfaces. Cartridge magnetic tapes 1 are separated by stage boards 9 and are center boards 6 and arranged vertically. The cartridge magazine is provided on its upper surface with a set-in type handle 2 so that the magazine can be transported conveniently, and a label area 4 for use in displaying information thereon for controlling the magazine. In both side surfaces of the cartridge magazine, vertical guides 3 are provided, which are used to move the magazine smoothly and prevent the magazine from falling when the magazine is mounted on an automatic cartridge changer 14. The magazine is further provided with tapered portions so as to be easily mounted on the automatic cartridge changer 14. The cartridge magazine includes a stopper 7 urged by a spring 8 against one side surface of all of one set of cartridge magnetic tapes 1. The stopper is supported on upper and lower fulcrum surfaces of the magazine. Latch stoppers 5 are positioned on the opposite side of the cartridge magazine from the stopper 7. Each latch stopper 5 has a cantilever type construction and respectively engages a single cartridge magnetic tape 1. The lengths of the right and left stage boards 9 are different, and the center board 6 has grooves that are formed in the portions of the upper surface thereof, separated from the relative lateral edges of the center board by different distances. These two grooves engage two projections on the lower portion of the cartridge magnetic tape, whereby, if the cartridge magnetic tape 1 is inserted erroneously into the cartridge magazine, the former will not move easily into the latter. Each center board 6 is joined at its opposite side surfaces to the magazine body for preventing the side surfaces from being deformed and for increasing the strength of the board.

FIG. 2 is a top view in section of the cartridge magazine 10 and cartridge magnetic tape 1. The arrow in the drawing indicates the direction in which the cartridge magnetic tape 1 is inserted into a magnetic tape unit by the automatic cartridge changer. In FIG. 3a is an operational diagram shows how the stopper 7 prevents the cartridge magnetic tape 1 from running out in the direction opposite to the direction shown by the arrow in FIG. 2. In FIG. 4a, an operational diagram shows how the latch stopper 5 prevents the cartridge magnetic tape 1 from running out in the direction of the arrow in FIG. 2. Each of these stoppers has a latch structure adapted to engage the cartridge magnetic tape 1 inserted into the cartridge magazine and moved forward, but disengage from the cartridge magnetic tape 1 inserted into the cartridge magazine, once engaged therewith and then moved back. In this latch structure, the cartridge magnetic tape 1 is adapted to engage cartridge notches 11, 12. Especially, the stopper 7 has a fulcrum on its inner side adjacent the side surface of the cartridge magnetic tape 1. Accordingly, even when a rushing force is applied to the already-set cartridge magnetic tape 1 in the direction opposite to the direction to the arrow in FIG. 2, of turning the stopper does not occur.

While the cartridge magazine holding regular cartridge magnetic tapes 1 therein is transferred, the latch stoppers 5 and stopper 7 on both sides are in operation as shown in FIGS. 3a and 4a, so that the cartridge magnetic tapes 1 do not run out. When a cartridge magnetic tape 1 is initially set, the respective latch stopper 5, and stopper 7 escape in whichever direction the cartridge magnetic tape 1 is inserted, so that the inserting of the tape 1 can be done easily.

FIG. 5 is a sketch of the automatic cartridge changer 14 on which the cartridge magazine 10 holding the cartridge magnetic tapes 1 is mounted. The cartridge magazine 10 is placed on an elevator 13 in the automatic cartridge changer 14, and each cartridge magnetic tape 1 held in the magazine is set in a position, in which the tape can be inserted into a magnetic tape unit, by moving the elevator 13 vertically.

The cartridge magnetic tape 1 set in the insertable position is inserted into the magnetic tape unit, and the cartridge magnetic tape in the magnetic tape unit is discharged from the cartridge magazine, by pinch rollers, and thereafter replaced automatically by repeating these operations.

The front side of the automatic cartridge changer 14 is opened so that the cartridge magnetic tapes 1 are not hidden even when the cartridge magazine 10 is mounted on the automatic cartridge changer 14 and moved vertically.

When the cartridge magnetic tape 1 is in the position in which it can be inserted into the magnetic tape unit, as shown in FIG. 4b, the hooked portion latch stopper 5 is drawn outward. In this position, the tape 1 can be driven only in the direction in which it is inserted into the magnetic tape unit, so that the inserting and discharging of the magnetic tapes into and from the magnetic tape unit can be done properly. If the operator moves a cartridge unlatch lever 16 during an operation of the automatic cartridge changer 14, the stopper 7 is turned as shown in FIG. 3b, and set free, so that the operator can remove the cartridge magnetic tape 1. The cartridge magnetic tape 1 is held in a projecting state in the cartridge magazine 10, and an outer cover for the automatic cartridge changer 14 is separated by a certain distance from the projecting portion of the cartridge magnetic tape 1. Therefore, the cartridge magnetic tape can be grasped easily when it is taken out.

The side of the automatic cartridge changer 14 which is opposite to the side thereof at which the inserting and discharging of a cartridge magnetic tape are done between the cartridge magazine 10 and the magnetic tape unit in the automatic cartridge changer 14 has no relation with the operation of the automatic cartridge changer 14. An opening, at which the withdrawing and inserting of the cartridge magnetic tape 1 can be done by the automatic cartridge changer 14 without being obstructed, is formed in the wall of the automatic cartridge changer 14 which has no relation with the replacement of the tape 1. Accordingly, the cartridge magnetic tape can be removed and loaded even when the automatic cartridge changer is in operation.

Even if the stopper 7 is fixed by utilizing the lower tapered portion of the cartridge magnetic tape 1 as shown in FIG. 6, in such a manner that the stopper 7 can be turned as shown by the dashed line, the same effect can be obtained.

According to the present invention, a cartridge magazine is mounted on an automatic cartridge changer, and, even when the automatic cartridge changer is in operation, the operator can arbitrarily carry out the withdrawing or inserting of unprocessed and processed cartridge magnetic tapes. In the case where a processed cartridge magnetic tape which is to be processed immediately by another magnetic tape unit, or a cartridge magnetic tape which has been set erroneously in a cartridge magazine, has to be replaced during an operation of the automatic cartridge changer, a necessary operation can be carried out without interrupting the automatic cartridge chamber. This reduces the number of the operator's tape handling steps, and shortens the operational time.

Since a processed cartridge magnetic tape is replaced by a new cartridge magnetic tape by operating an automatic cartridge changer continuously, cartridge magnetic tapes exceeding a prescribed capacity of the cartridge magazine can be automatically changed.

Moreover, since the cartridge magazine according to the present invention can be made very compact, it can be transported and kept conveniently.

I claim:

1. A cartridge magazine containing a plurality of stacked cartridge magnetic tapes used to read and write information, mountable on an automatic cartridge changer having a first opening from and into which a cartridge magnetic tape can be removed and loaded in a first direction, a second opening from and into which said cartridge magnetic tape can be removed and loaded in a second direction, a first means for independently preventing each of said cartridge magnetic tapes from running out through said first opening when each of said magnetic tapes is loaded into said magazine, a second means for preventing run-out of said plurality of cartridge magnetic tapes as a group through said second opening when said cartridge magnetic tapes are loaded in said magazine and means for releasing said first and second run out preventing means to allow runout of said cartridge magnetic tapes as desired.

2. A cartridge magazine according to claim 1, wherein each of said cartridge magnetic tapes is held in said cartridge magazine so that said cartridge magnetic tape projects slightly from at least one opening at a predetermined side of each pair of said first and second openings.

3. A cartridge magazine according to claim 1, wherein said first and second directions are opposite to each other.

4. A cartridge magazine according to claim 1, wherein said means for releasing includes first means for releasing said first run-out preventing means such that said cartridge magnetic tapes are dischargeable independently of one another through said first opening, and second means for releasing said second run-out preventing means such that all of said cartridge magnetic tapes are dischargeable at once from said magazine through said second opening.

5. A cartridge magazine comprising:
   a frame defining a chamber for containing cartridges having side walls, a top wall and a bottom wall connected together;
   said frame having first and second openings for loading and removing cartridges, the width of said openings being wider than at least a width of said cartridges;

at least one stage board fixed to an inner side of said side walls, for loading a plurality of cartridges into said chamber;

first stopper means for preventing run-out of loaded cartridges from said chamber through said first opening, including means for allowing insertion of cartridges into said chamber through said first and second openings; and second stopper means for preventing run-out of the loaded cartridges from said chamber through said second opening, including means for allowing insertion of cartridges into said chamber through said first and second openings.

6. A cartridge magazine according to claim 5, wherein said cartridge magazine is mountable on an automatic cartridge changer for selective loading and removing of said cartridges loaded in said chamber, and said frame further has guide means for guiding the mounting of said cartridge magazine on said automatic cartridge changer.

7. A cartridge magazine according to claim 6, wherein said guide means includes a groove provided in a side wall of said frame.

8. A cartridge magazine according to claim 5, further comprising:
a handle for carrying said cartridge magazine provided at the top of said frame.

9. A cartridge magazine according to claim 6, further comprising:
a handle for carrying said cartridge magazine provided at the top of said frame.

10. A cartridge magazine according to claim 5, wherein said first stopper means operates independently with respect to each of the cartridges loaded in said chamber.

11. A cartridge magazine according to claim 10, wherein said first stopper means is shaped to engage a notch formed in each said cartridge.

12. A cartridge magazine according to claim 5, wherein said second stopper means is a unitary body that operates to prevent run-out of all of said cartridges loaded in said chamber.

13. A cartridge magazine according to claim 12, wherein said second stopper means is shaped to engage a notch formed in each said cartridge.

14. A cartridge magazine according to claim 5, wherein said first stopper means is mounted on one of said side walls near said second opening of said frame, and said second stopper means is mounted on the other of said side walls near said second opening of said frame.

15. A cartridge magazine according to claim 14, wherein said first and second stopper means are respectively mounted on each of said side walls in opposed positions to one another near said second opening of said frame.

16. A cartridge magazine according to claim 1, wherein said first and second means further has means for permitting insertion of said cartridge magnetic tapes when loading.

* * * * *